Jan. 14, 1969     R. W. HERGONSON     3,421,169

CAR WASHER

Filed Oct. 14, 1966     Sheet _1_ of 4

INVENTOR.
ROBERT W HERGONSON

ATTORNEY

INVENTOR.
ROBERT W. HERGONSON.

United States Patent Office 3,421,169
Patented Jan. 14, 1969

3,421,169
CAR WASHER
Robert W. Hergonson, Syracuse, N.Y.
(2387 Lisa Lane, Apt. 27, Pleasant Hill, Calif. 94523)
Filed Oct. 14, 1966, Ser. No. 586,744
U.S. Cl. 15—21     10 Claims
Int. Cl. B60s 3/04; A47l 25/00

ABSTRACT OF THE DISCLOSURE

Car washing apparatus comprising a drive through wash tunnel, with means for guiding the wheels on one side of a car through the tunnel, separate spray means within the tunnel near the entrance and exit thereof for applying wash water and detergent and rinse water to opposite sides of a car passing through, means responsive to the car wheel tread on the other side of the car for varying the spacing between the separate spray means, rotary brush scrubbing means disposed in staggered and inclined relationship on opposite sides centrally of the tunnel with spacing varied by the wheel tread responsive means, and swinging spray jet means in the tunnel for applying water upon the front top, back and rear end surfaces of a car adapted to follow the contour of the car to maintain the jets substantially uniformly spaced from the car surfaces.

This invention relates to car washing apparatus of a fully automatic type to fit the contour of any size or shape of car.

In car washing apparatus it is the practice to draw the car through a wash tunnel by conveyor chains coupled to the car. Attempts have been made to utilize the power of the vehicle, having the driver or an attendant drive the car through the wash tunnel at a low satisfactory speed for washing. The blinding effect of a deluge of wash water creates a problem in connection with self propelling the vehicle because the blinding effect upon the driver may cause the driver to deviate from the center of the wash tunnel, due to inability to see or follow guide lines. Wheel guides or tracks are not useable to center a vehicle because of the wide variation in the width of wheel treads. Unless the vehicle moves down the center of the wash tunnel the washing effect from opposite sides will differ greatly and with narrow cars, the effectiveness is impaired. Additionally it has been difficult to adequately wash the rear surfaces of a vehicle, since apparatus to treat these surfaces must clear the vehicle as it passes through, and provision for such clearance has made it necessary for the apparatus to attack the cleaning of such surfaces from too great a distance.

The present invention is directed toward overcoming the foregoing objections, in that provision is made for guiding the vehicle on one side of a car, and varying the tunnel width by moving the wash apparatus on the opposite side toward or away from the vehicle in accordance with its width. Further the invention contemplates apparatus which will follow the contour of the car and thus be effective at washing and rinsing the trailing surfaces such as the rear window, trunk deck and rear end surfaces.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figure 1:
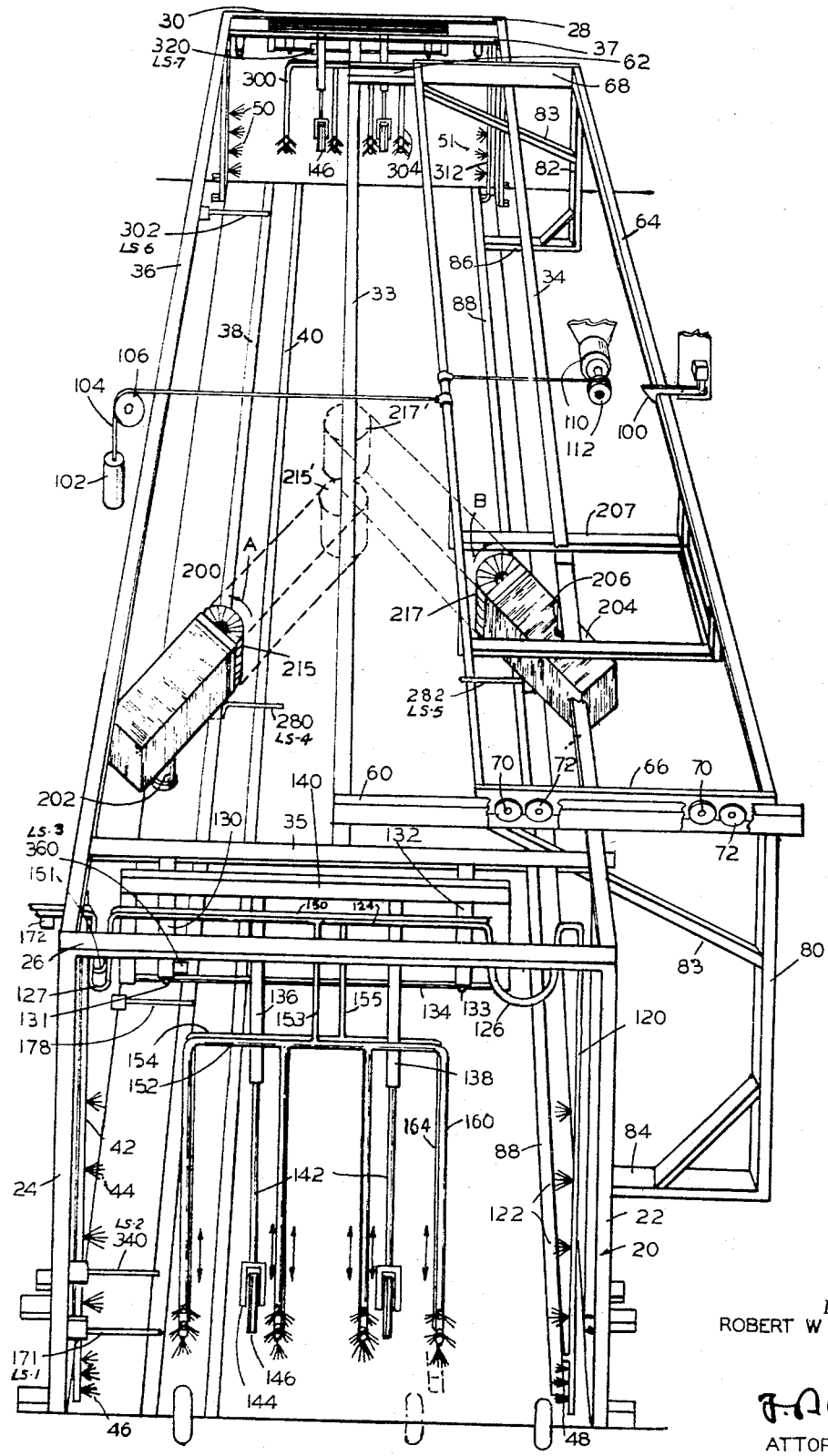
FIGURE 1 is a perspective schematic view of the wash tunnel taken from a point forward of and above the entrance.

Referring to FIGURE 1 there is shown what may be referred to as a wash tunnel having an entrance frame 20 with uprights 22 and 24, and an overhead transverse member 26, and an exit frame 28 also comprising uprights and an overhead transverse member 30. The end frames are joined by lengthwise extending beams 34 and 36. A central beam 33 is also provided, supported from transverse members 35 and 37. The floor of the tunnel will include suitable drains for wash water and rinse water recovery, not shown, and on one side, preferably to the left are spaced guide rails 38 and 40 forming a trackway, to receive the left hand wheels of a vehicle, such guide rails being of a sufficient height to prevent the vehicle wheels from escape therefrom. At a suitable distance inward of the entrance frame is a left hand conduit 42 with a plurality of spray nozzles 44 for directing detergent laden wash water delivered under pressure towards the left side of the vehicle, such wash spray nozzles being disposed at a suitable distance from the track way for maximum effectiveness and coverage in washing the left hand side of the vehicle. Suitable nozzles in a branch conduit for washing the wheels of the vehicle may also be provided as at 46, inwardly of the frame upright 24. Similar wheel wash sprayers 48 may be provided for the right hand wheel of the vehicle.

Near the exit end of the tunnel, there is provided a series of rinse water nozzles 50 to rinse the left hand side of the vehicle, a lower nozzle of which may be directed for wheel rinsing.

In order to effectively wash the right hand side of the vehicle, regardless of vehicle width, the apparatus for applying detergent wash water and rinse water are mounted on a laterally movable frame work, whose location may be determined from the car wheel tread width. As shown, channel members 60 and 62, mounted on beams 33 and 34 extend transversely of the trackway, and form facing roller guide ways for a transversely movable frame 64, having end members 66 and 68, each containing two pairs of rollers 70 and 72, the rollers 72 engaging the inside surface of the lower flange of the members 60 and 62, while the rollers 70 engage the inside surface of the upper flange of the members 60 and 62. Suspended from the right hand side of the frame are depending end brackets 80 and 82, suitably braced as at 83 to the end members 66 and 68. The lower ends of said brackets are provided with lateral tongues 84 and 86 sweeping close to the floor and support a right hand wheel sensing rail 88, of suitable height to lightly bear against the lower portion of the pneumatic tires of the right hand wheels of a car, during the traverse of the car through the tunnel. The frame 64 is held retracted by a suitable solenoid released latch 100 mounted on the tunnel ceiling, and when the latch is released, the frame 64 is urged laterally to the left by light pressure established by the weight 102, acting through cable 104 passing over a ceiling supported pulley 106. Such weight may be in the order of approximately eight pounds.

The frame 64 is retracted against the urge of the weight 102 by a motor 110 supported from the ceiling, and a cable and drum 112. The motor, or its cable drum are free running when the motor is deenergized, so that the frame 64 is free to move under the gravitational force on the weight 102. When the frame is retracted by the motor 110, to the position shown, the latch 100 automatically operates to hold the frame 64 in the position shown, until released.

Extending upwardly from the wheel sensing rail 88 is a tube 120 having spray jets 122 for administering under pressure detergent wash water to the right hand side of the vehicle and a branch tube serves the wheel jets 48. Such tube at its upper end is connected to a transverse detergent wash water supply pipe 124 through a flexible connection 126. The supply pipe 124 is provided with a second flexible connection 127 to the other end of the spray tube 42, so that spray tubes 42 and 120 may be supplied from a single valve.

In order to follow the contour of the front, deck, windshield top, rear window, trunk deck and rear of the car, and apply under pressure detergent wash water thereto, there is provided a swinging arch, the lower end of which depends in front of the approaching vehicle. For this purpose, the frame member 35 is provided with depending struts 130 and 132 having bearings 131 and 133 on their lower ends for a rock shaft 134, to which are affixed arch support members 136 and 138. The arch support members extend above the shaft 134 to support a counterweight 140, and have one or more rod extensions 142 depending to a position in front of the path of the vehicle. Each of the rods have forked ends 144 in which are journalled large rollers 146, having soft rubber treads of sponge rubber or other soft material which is adapted to roll over the vehicle, without injury thereto. It will be seen that the pipe 124 is carried on the rocking arch support members 138, the flexible connectors 127 and 126 permitting rocking movement. A second supply pipe 150 is carried by the arch support members, as will appear, and is provided with a flexible connection as at 151.

Carried by the arch support members 136 and 138 are arch like spray tube manifolds 152 and 154, connected to the supply pipes 124 and 150 respectively by conduits 153 and 155. Each manifold 152 and 154 is provided with four depending rigid tubes 160 and 164 having a nozzle or nozzles at their lower ends. The tubes 160 extending from the manifold 152 have a single nozzle 162 at their lower ends directed at substantially a right angle from their respective tubes 160, whereas the tubes 164 depending from the manifold 154 are each provided with three nozzles 166, 168 and 170 (see FIGURE 2). The arrangement will be seen to be such as will clear any radio antennas carried by the vehicle.

Figure 2:
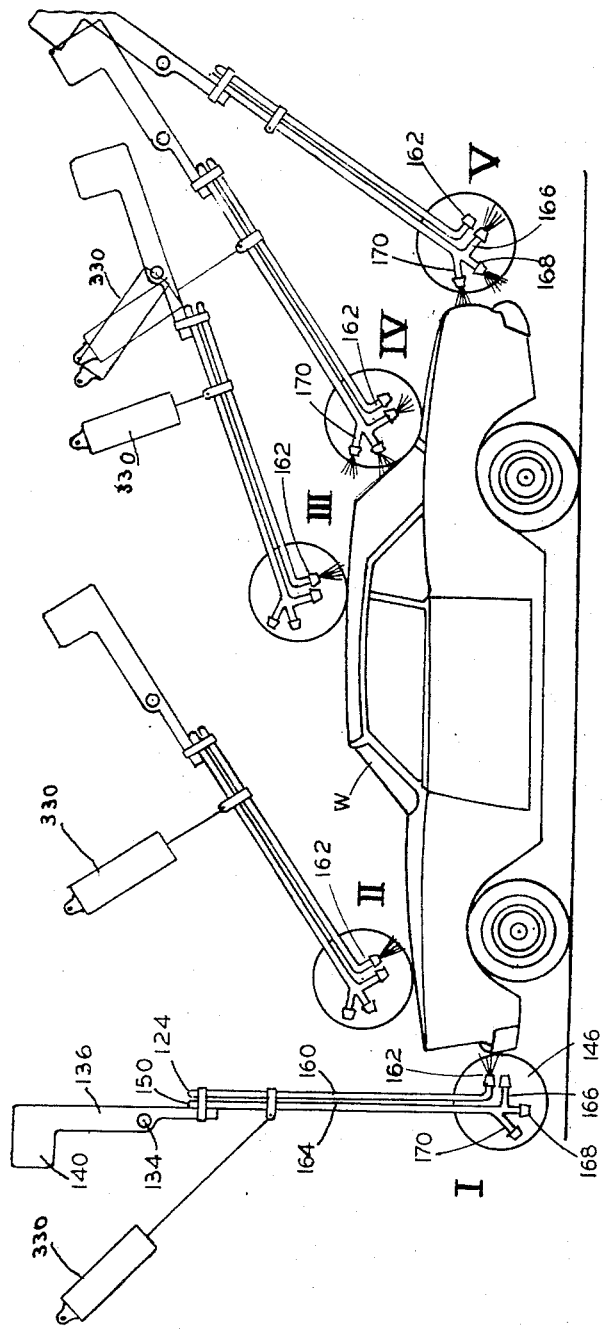
FIGURE 2 is a schematic side view diagram showing the various positions of the washer and apparatus relative to the car in following the vehicle decks and roof contours as a car proceeds through the tunnel, and may serve to illustrate the rinse apparatus as well.

In FIGURE 2, there is shown the successive relative positions taken by the swinging spray arch as the vehicle proceeds through the tunnel, such positions being indicated by the numerals I, II, III, IV and V. As the vehicle approaches the spray arch in position I, detergent wash water under pressure is supplied to supply pipe 124, as well as the spray pipes 42 and 120 and the wheel sprays 46 and 48, by a single solenoid valve actuated by limit switch 171. The four nozzles 162 direct a deluge of detergent wash water towards the front of the vehicle. As the vehicle engages the soft rollers 146, the swinging arch is swung forward by the forward movement of the vehicle and in position II, the nozzles 162 are washing the hood, and about to wash the windshield, as the car continues. Thereafter, as the car proceeds, the rollers ride up the windshield W, roll along the roof, while the nozzles 162 continue to spray the car roof.

When the car reaches a position such that the rear end of the car is beyond the effect of the side spray nozzles 44 and 122, and the wheel nozzles 46 and 48, the side spray and wheel nozzles are cut off, as well as the nozzles 162, and the wash water supply is shifted to conduit 150, whereby detergent wash water under pressure is delivered to the twelve nozzles 166, 168 and 170, the swinging arch taking the position indicated at IV about this time. Thus nozzles 168 are directed at the rear window, while nozzles 170 are partially directed at the rear window and window frame thereabove. Nozzles 166 are directed at the rear deck. As the car proceeds to the relative position indicated at V, nozzles 70 and 68 are effective to apply detergent wash water to the rear end. After the car proceeds a short distance further, the supply to pipe 150 and nozzles 166, 168 and 170 is cut off. The downward movement of the nozzles, after the roof of the car has passed through, is retarded by a hydraulic check 330.

When the car enters the frame 20, the front end engages a limit switch 171, which operates a solenoid valve 172 in the detergent wash water supply line which supplies the wheel, side sprays, and the nozzles 162 of the swinging arch. In order to scrub the dirt from the sides of the car, where it is heaviest, and most difficult to remove, left and right hand revolving scrubbing brushes 215 and 217 are provided for the left and right hand side of the vehicle. Such brushes revolve preferably in the directions of arrows A or B, or in the direction of movement of the vehicle. The housing 200 for brush 215 is mounted on a fixed pedestal 202. The housing 204 for brush 217 is hung by a column 206, from frame work 207 slung from the frame 64, the frame work 207 being located below beam 34. Thus it will be seen that the brush 217 will be moved laterally with the movement of the frame 64 in its movement in sensing the car width.

As will appear hereinafter, both brushes are adapted to move from a retracted position, clear of the vehicle, into vehicle engagement under light force, and as the rear of the vehicle passes beyond the brush 215, the brush follows the vehicle, scrubbing its rear end to the center as indicated at 215′. Likewise brush 217 follows the rear end of the vehicle to the center to the position at 217′. The housing 200 for brush 215, and the housing 204 for brush 217, are sufficiently staggered so as to avoid any interference between the brushes, the housing 200 being several feet in advance of housing 204.

The rotary brushing or scrubbing devices are mounted for telescopic movement within relatively stationary housings, housing 200 being mounted on a pedestal 202 to the left of the trackway, and housing 204 being hung by the column 206 from the laterally movable frame work to the right of the runway. The housings 200 and 204 may be rectangular in cross section and open at either end. Within each housing is a telescopic rectangular section tube 208 adapted to be moved from the position shown to an extended position as by rollers 210 and 212 carried by the tube at its rear end and the housing 200 or 204 at the brush end respectively. In the end of the tube 208 is a rotary brush 215 mounted on a vertical shaft 216 journalled in the end of the tube 208. Such brush may be driven by a belt or chain drive 218 from a motor 220 mounted within but at the other end of the tube, power being supplied to the motor by a flexible cable, not shown. The end of the tube may have a partition 222, having an aperture for the belt drive 218, to prevent wash water from entering the tube.

Means for urging the tube 208 to extend itself from its housing to engage the side of a car, or follow through in engagement with the rear end of a car, under light pressure may comprise a cable and weight for urging a constant light force. Such apparatus may comprise a cross shaft 230 mounted in the housing crosswise thereof, suitable slots 232 being provided in the tube to clear the shaft, the slots being of a suitable length to provide suitable end limits for the telescopic movement of the brush tube. A cable 234 affixed to a cross member 238 secured within the tube 208 extends about a pulley 240, on shaft 232, and thence around pulleys 242 and 244 journalled on shafts affixed to the housing end in any suitable manner. The cable extends over pulley 244 and is provided with a weight 246, which in practice may be about eight pounds.

Figure 4:
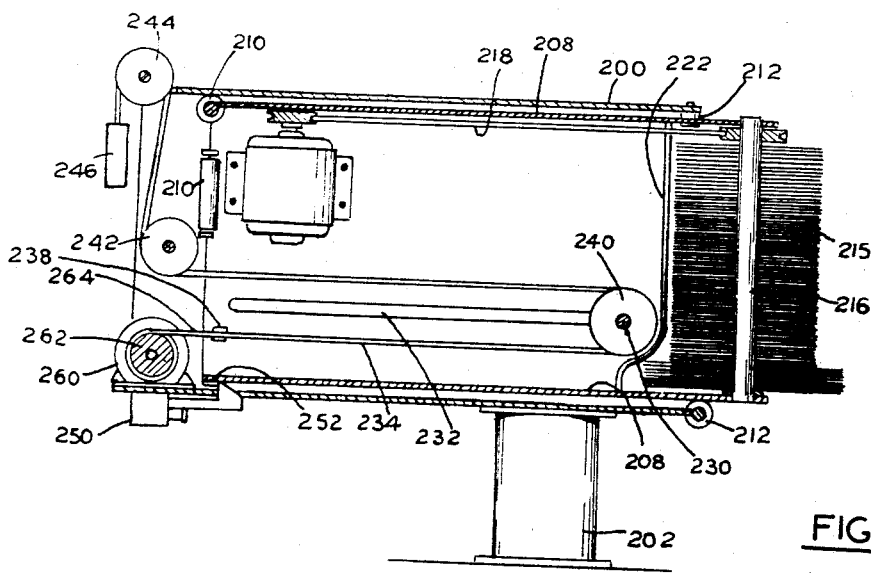
FIGURE 4 is a sectional view through the rotary brush mount.

A solenoid actuated latch 250 mounted on the underside of the housing end is adapted to releasably engage a wedge member 252 on the underside of the tube 208 to hold the tube retracted in the position shown in FIGURE 4.

A small motor 260 with a small cable drum 262 is adapted to retract the tube 208 through a light cable 264 which is affixed to the cross member 238. Except when the motor is energized for retraction, the drum is free to rotate to unwind cable, as the weight 246 urges the tube and brush into light engagement with the side or rear of the vehicle. When the motor retracts the tube 208 to the position shown, the latch 250 automatically holds the tube retracted, until released by a limit switch.

As the car approaches within range of the telescopic movement of brush 215, a limt switch 280 is tripped which releases the latch 250, allowing the brush to move outwardly into car contact, whereupon the deluge of detergent wash water already applied to the car is lightly scrubbed by the brush during wash water run off. Shortly thereafter limit switch 282 releases latch 250 on brush 217, to permit it to engage the right hand side of the vehicle for similar action.

Figure 3:
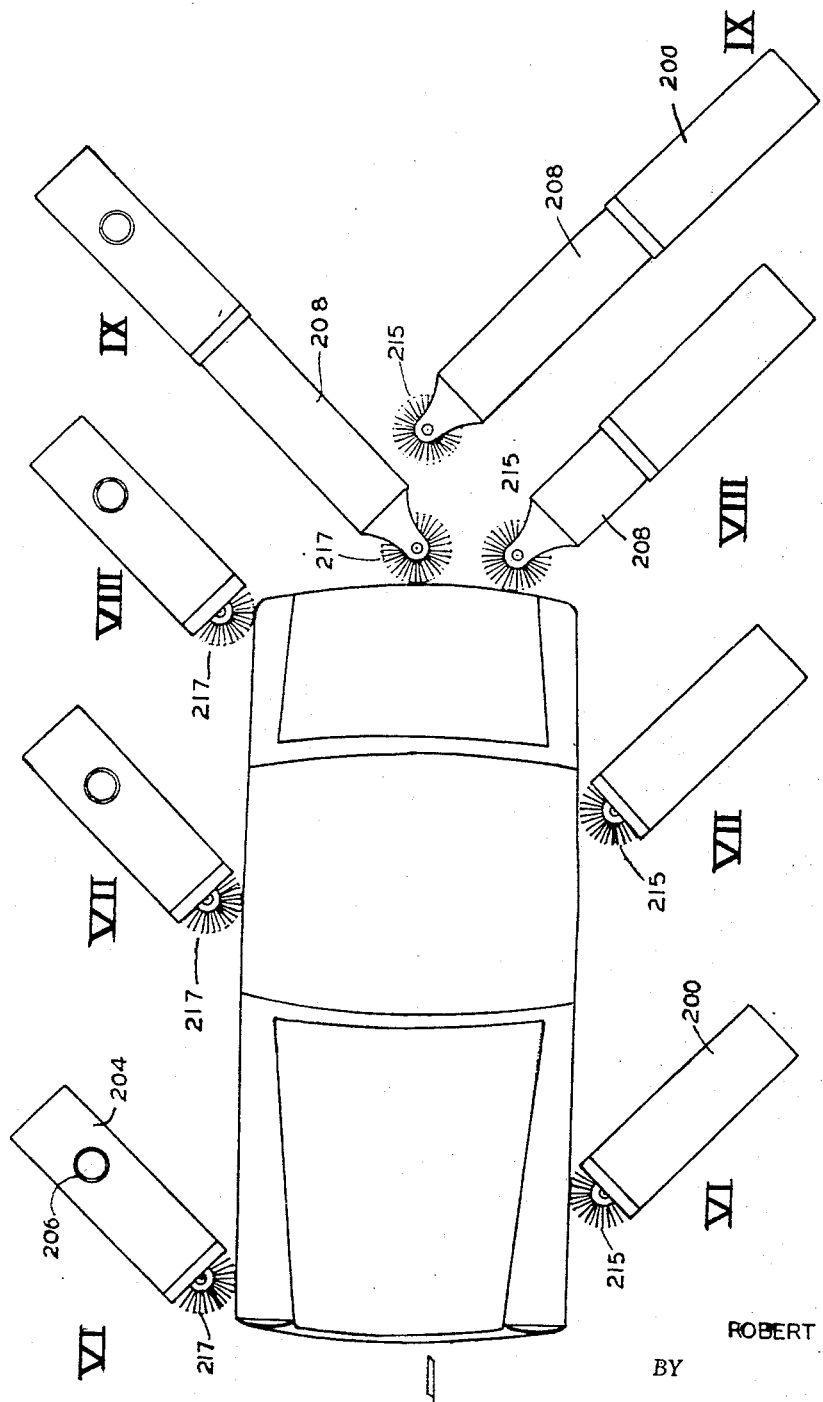
FIGURE 3 is a similar schematic plan view diagram showing the various positions of the side and rear end rotary brush scrubbing apparatus relative to the car as it proceeds through the tunnel.

In FIGURE 3 successive stages VI, VII, VIII and IX are illustrated showing the relative position between the car and brushes. In stage VI, the brush 217 has just been projected into contact with the right hand front end of the car, and brush 215 has already been in contact for several feet. Contact is maintained as the car moves forward to the relative position indicated at VII. As relative position VIII is reached brush 215 has moved part way inwardly along the back of the vehicle toward the center, while brush 217 is about to commence moving inwardly. In position IX, the brush 217 is shown as at the center of the back, and the car has left brush 215 several feet behind.

At the exit end of the tunnel is a swinging rinse water arch 300 which may be identical with the swinging detergent wash water arch, except a single supply pipe is employed, and the depending pipes 304, each carry three nozzles directed in the same manner as nozzles 166, 168, and 170.

As soon as limit switch 302 is actuated, rinse water is supplied to all 12 nozzles simultaneously, and rinse water continues to flow after the limit switch 302 is cleared. The swinging rinse water arch is provided with soft cushion rollers 156, which ride over the car in the same manner as the swinging wash water arch rollers, and the side spray nozzle 50 rinses the left side of the vehicle, while nozzles 51 carried on a supply tube 312 extending vertically upward from the sensing rail 88 rinses the left side. The spray nozzles 50, 51, and swinging arch nozzles may be controlled and supplied through a single valve turned on by limit switch 302 and cut off by a limit switch 320, the latter being actuated by the movement of the arch 300 back to its initial vertical position, after the vehicle has cleared the swinging arch by several feet.

Both of the swinging arches are provided with hydraulic checks 330 operating to allow the swinging arch to swing back slowly after the rollers leave the roof and rear portion of the car. Such checks offer no resistance during the lifting of the arch by the car proceeding therethrough. The counterbalance weights 140 of both arches are set forward of center to offset the reaction of the jet from nozzles 162 in the wash water arch, and the nozzles corresponding to nozzles 166 in the rinse water arch.

The operation of the apparatus is automatic as the car is driven through the tunnel. As a car enters the tunnel, the front left fender trips limit switch 171 which is held tripped until the car clears the switch. Switch 171 opens a valve to supply wash water under pressure to the wheel nozzles, 46 and 48, the side nozzles, 44 and 122 and the four swinging arch nozzles 162. Switch 171 also releases the latch 100 which allows the wheel sensing rail 88 to move toward the right hand vehicle wheels. The switch 171 also starts rotation of the brushes 215 and 217. As the car proceeds through the side wash jets, limit switch 340 is closed and held closed until the car clears the switch. Such switch cuts off the wash water supply initiated by switch 171, and opens a solenoid valve to supply tube 150 and the twelve nozzles 166, 168 and 170 to supply detergent wash water under pressure thereto. As the swinging arch is cleared by the vehicle, and returns to the vertical position, a limit switch 360 carried by the arch, closes the valve supplying wash water to tube 150.

As previously set forth, limit switch 280 releases latch 250 of brush 215 when the car reaches the position VI, and limit switch 282 releases latch 250 of brush 217 as the car advances into the range thereof. When the car reaches the limit switch 302, a rinse water solenoid valve is opened, and such valve remains open until limit switch 320 actuates the valve to closed position. Limit switch 320 also causes the motors 260 to retract the brushes 215 and 217, and to stop the rotation thereof, and to energize the motor 110 to retract the right hand wheel sensing frame, at which time a signal, indicating the apparatus is ready for the next vehicle, may be energized. Although the apparatus is adapted to operate upon cars driven through under their own power, it should also be apparent that the cars can be moved by conveyor mechanism, with equal results.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A car washing apparatus comprising a wash tunnel having an entrance and an exit, means for guiding a car through the tunnel, separate spray means within the tunnel near the entrance thereof for applying wash water and detergent to opposite sides of a car passing therethrough, and means on the spray means responsive to the wheel tread for controlling the spacing between the separate spray means.

2. A car washing apparatus in accordance with claim 1 wherein one of the spray means is stationary and the means for guiding the car comprises guide rails for the wheels on one side of the car, and in which the means responsive to the wheel tread continuously engages at least one wheel on the other side of the car during the entire passage of the car through the tunnel.

3. A car washing apparatus in accordance with claim 1 wherein separate spray rinse means for applying rinse water to the opposite sides of the car are disposed within the tunnel near the exit thereof, and wherein the spacing between said spray rinse means is varied by the wheel tread responsive means.

4. A car washing apparatus in accordance with claim 3 wherein separate scrubbing means are disposed on opposite sides of the tunnel between the wash water means and the rinse water means, and wherein the spacing between said scrubbing means is varied by the wheel tread responsive means.

5. A car washing apparatus in accordance with claim 4 wherein each scrubbing means is mounted for movement toward and in the direction of car movement through the tunnel along a line approximately 45 degrees from the guide rails, and wherein means are provided for urging each of said scrubbing means into contact with a side and a half of the rear end of a car as it passes between and beyond the scrubbing means.

6. A car washing apparatus in accordance with claim 5 in which each scrubbing means comprises a vertical axis rotary brush.

7. A car washing apparatus in accordance with claim 1 having swinging spray jet means disposed within the tunnel for applying water upon the front top, back and rear end surfaces of a car, said means including means for following the contour of the car, and for maintaining the jet means substantially uniformly spaced from the car surfaces subject to the spray.

8. A car washing apparatus in accordance with claim 7 wherein the swinging spray jet means includes a plurality of parallel conduits pivotally mounted on an axis transverse of the tunnel in the upper part top thereof, and nozzles on the lower ends of the conduits, and roller means adjacent to said nozzles and adapted to engage the car and roll over the car and lift the nozzle ends of the conduits as the car proceeds through the tunnel, said roller means rotating on an axis parallel with the pivotal axis, and of a radius to provide substantially uniform spacing between the nozzles and car surfaces sprayed by the nozzles.

9. A car washing apparatus in accordance with claim 8, wherein the downward movement of the nozzle ends of the conduits is retarded by breaking means.

10. A car washing apparatus in accordance with claim 9, wherein the swinging spray jet means is disposed adjacent the separate wash water spray means and is supplied with water and detergent, and in which a second swinging spray jet means is disposed near the exit end of the tunnel and adjacent the separate spray rinse means, and supplied with rinse water.

References Cited

UNITED STATES PATENTS

| | | | |
|---|---|---|---|
| 3,196,888 | 7/1965 | Rousseau | 134—45 |
| 3,241,167 | 3/1966 | Murillo et al. | 15—21 |

EDWARD L. ROBERTS, *Primary Examiner.*

U.S. Cl. X.R.

134—45